United States Patent [19]
Burleson et al.

[11] 3,929,353
[45] Dec. 30, 1975

[54] TRAILER APPARATUS

[76] Inventors: Cuba L. Burleson; Charles B. Dillon, both of Box 157, Highway 36, S., Bellville, Tex. 77418

[22] Filed: Mar. 22, 1973

[21] Appl. No.: 343,829

[52] U.S. Cl. .......................... 280/423 R; 296/24 R
[51] Int. Cl.² ........................................ B62D 53/06
[58] Field of Search ......... 280/423 R, 423 B, 425 A

[56] References Cited
UNITED STATES PATENTS

| | | | |
|---|---|---|---|
| 3,433,503 | 3/1969 | Davis | 280/423 R |
| 3,659,876 | 5/1972 | Melton | 280/423 R |
| 3,703,301 | 11/1972 | Randle | 280/423 R X |
| 3,733,089 | 5/1973 | Goecke et al. | 280/415 A |
| 3,800,966 | 4/1974 | Newton | 280/423 R X |

*Primary Examiner*—Leo Friaglia
*Attorney, Agent, or Firm*—Pravel & Wilson

[57] ABSTRACT

A new and improved trailer apparatus including a right angle gooseneck drawbar structure angling downwardly for connection with the towing vehicle at an angle greater than 30° and less than 40° for enhancing operator visibility, usable cargo space and overall length. Numerous embodiments of removable superstructures and livestock gates are disclosed as well as an adjustable jack mounting arrangement to position the jack control handle at the side of the trailer.

8 Claims, 14 Drawing Figures

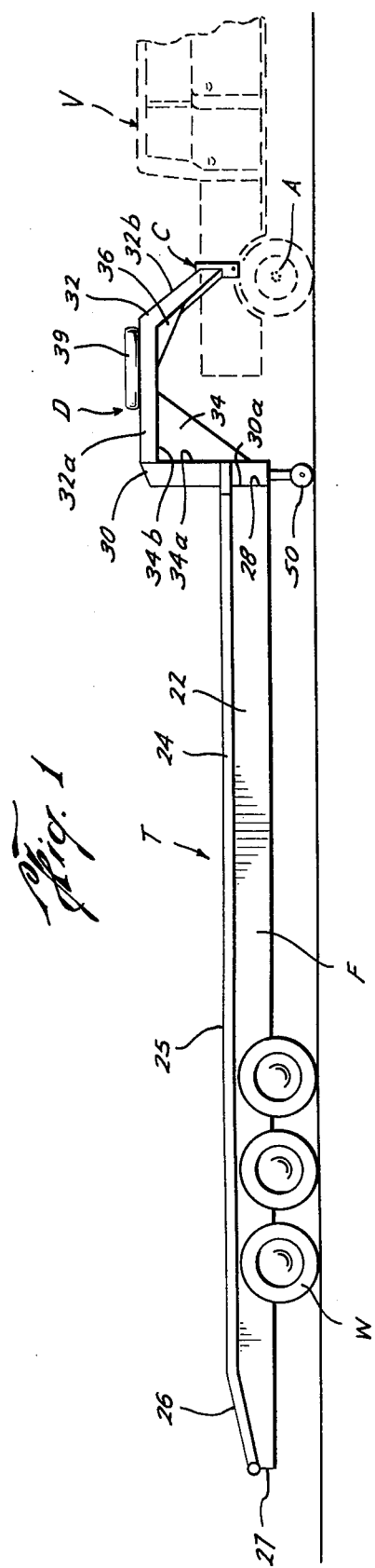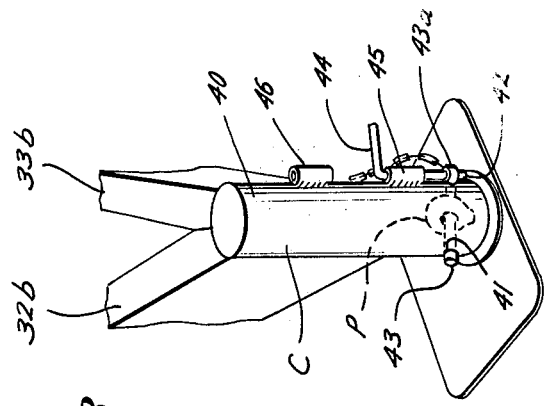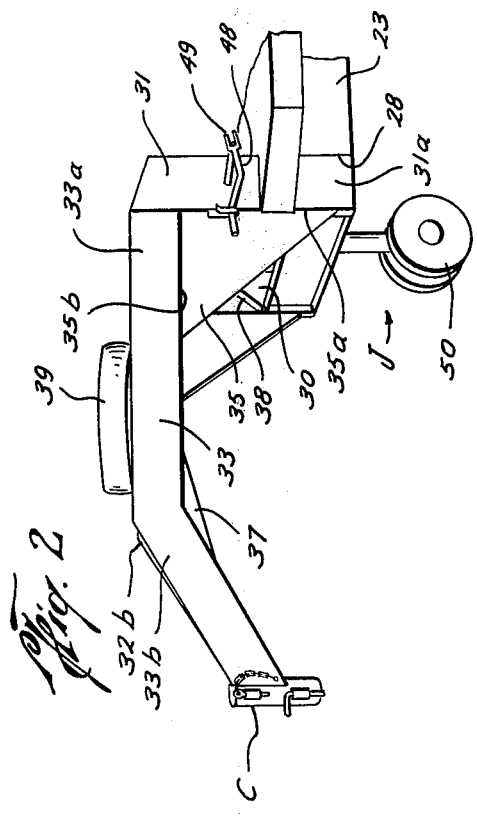

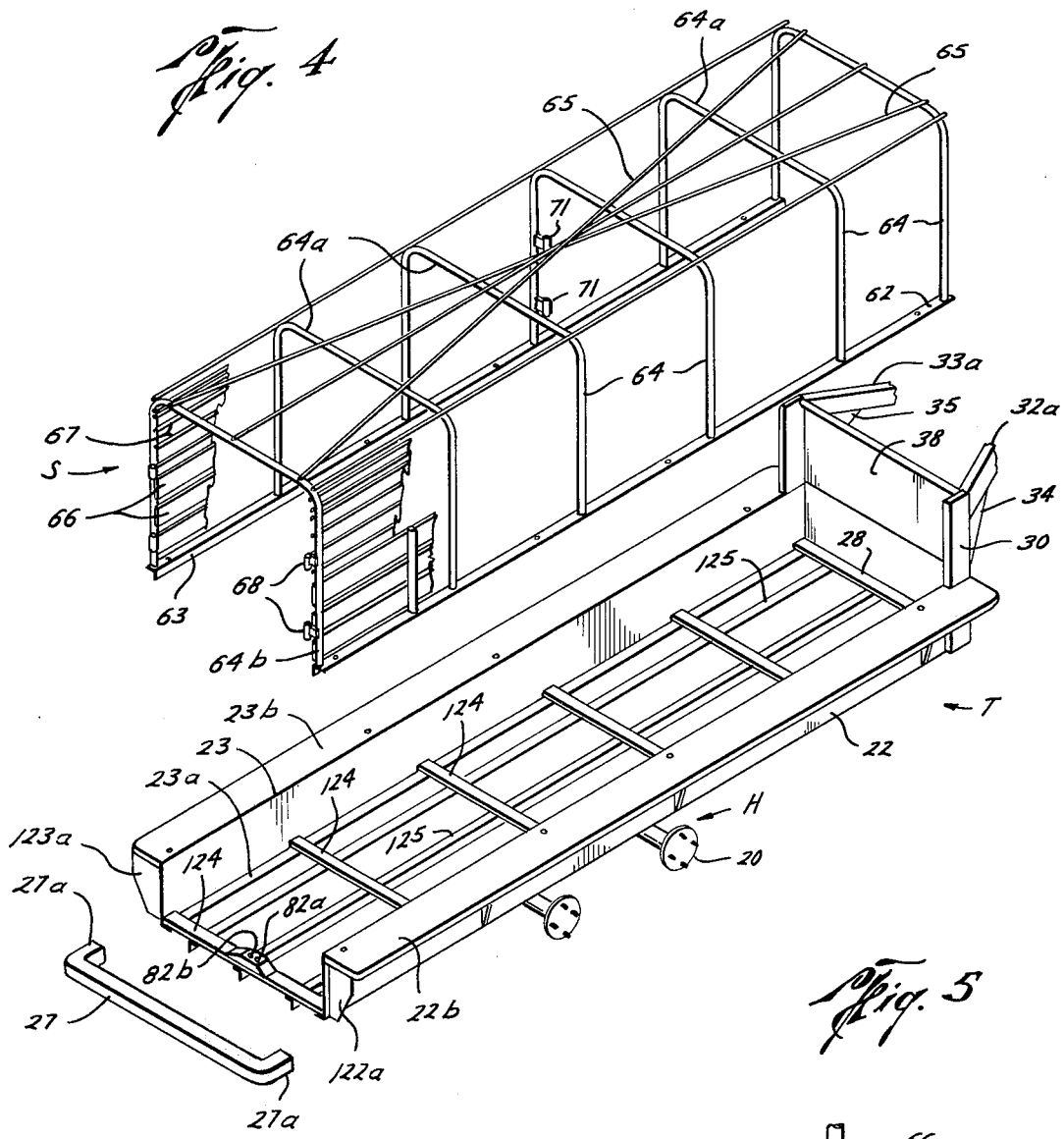

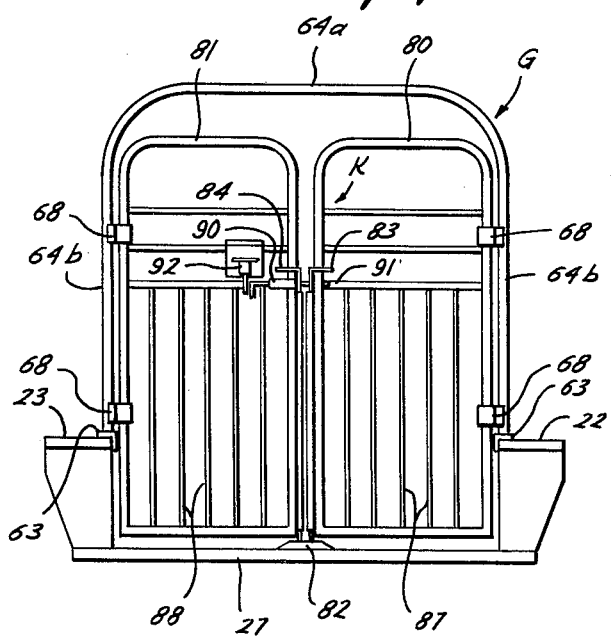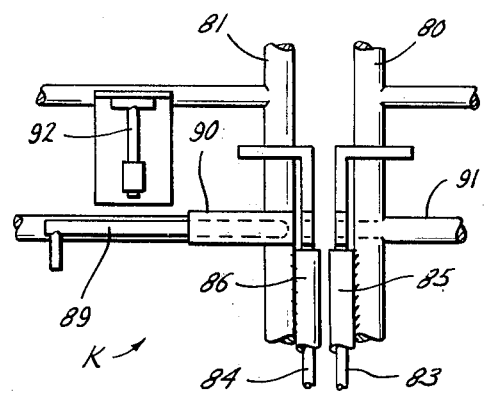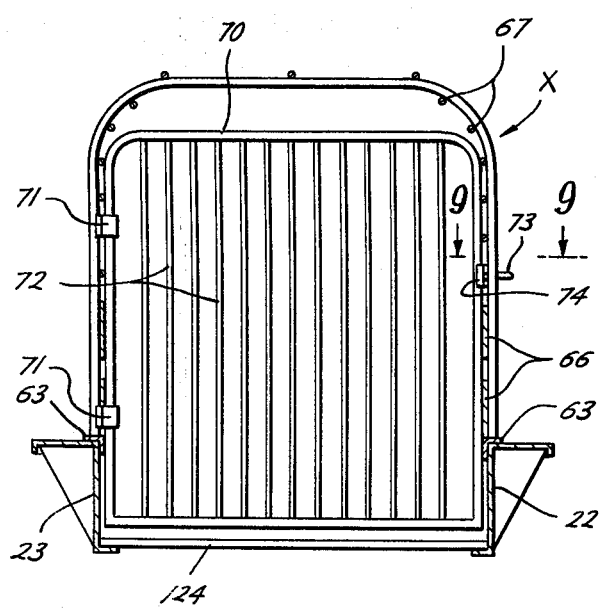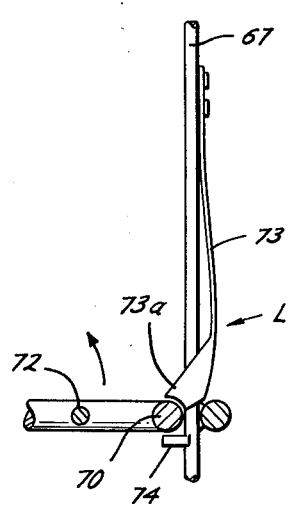

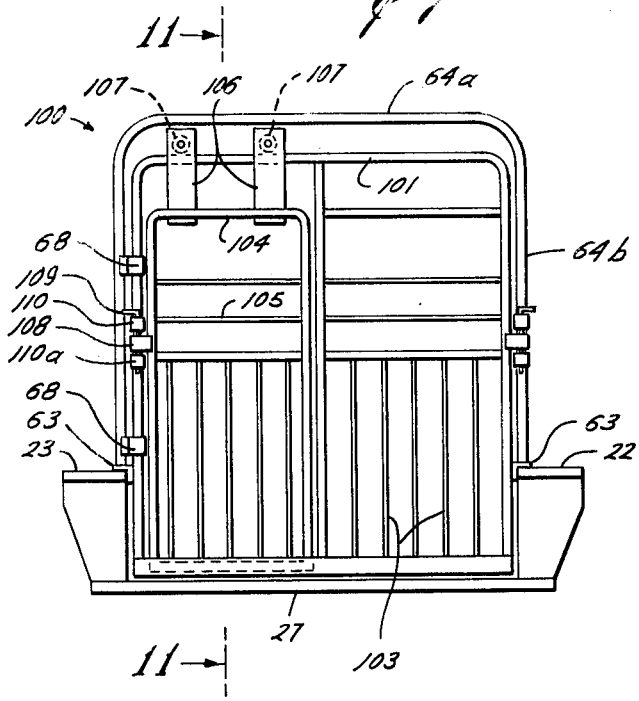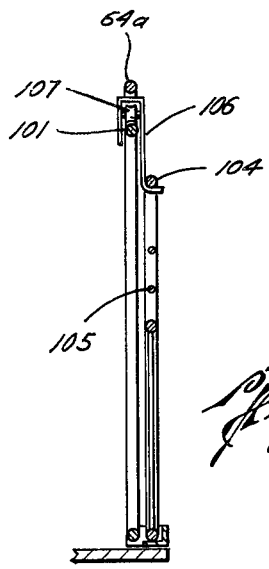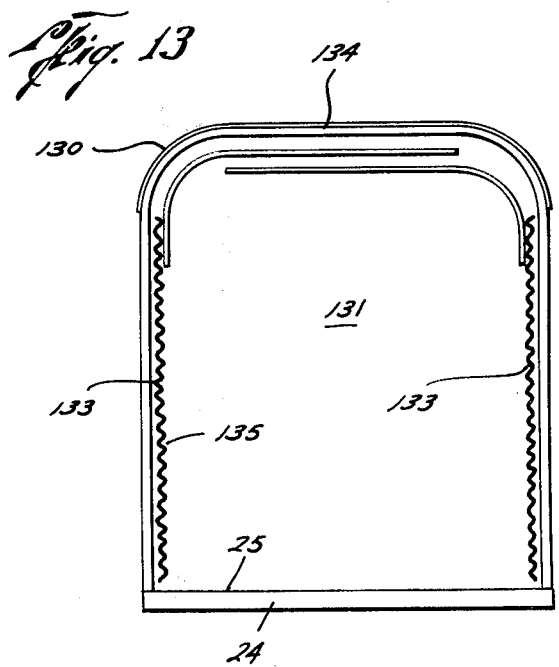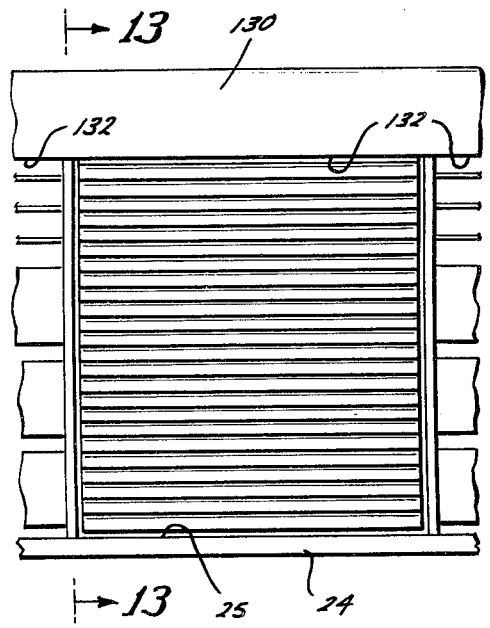

3,929,353

TRAILER APPARATUS

BACKGROUND OF THE INVENTION

This invention relates generally to the field of trailers and more particularly, to gooseneck trailers.

The need for larger load capacity trailers within public highway usage prescribed size limitations has long been a prime consideration in both trailer design and purchasing. The capability of a trailer to carry a bulky item or items has also been a desirable feature. These features have been particularly desirable in agricultural areas where gooseneck trailers have received widespread acceptance due to their proven load carrying versatility. However, the previous gooseneck trailers have had certain undesirable features such as reduced driver visibility, excessive overall length and catastrophic drawbar structural failures all of which limited total acceptance of these trailers.

Some prior art gooseneck trailers having the drawbar formed at a right angle to the trailer are disclosed in U.S. Pat. Nos. 2,777,713; 3,384,390; and 3,151,884, while other embodiments of gooseneck drawbars are disclosed in U.S. Pat. Nos. 1,799,846 and 2,393,016.

SUMMARY OF THE INVENTION

A trailer apparatus including gooseneck type drawbar angling downwardly at a preferred angle for connection with the towing vehicle while minimizing both gooseneck and overall length. A removable stock pen structure having selectively opening gates is releasably securable to the trailer in one disclosed embodiment while in another disclosed embodiment a housing fixed to the trailer is provided with roll-up doors to enable ingress and egress to a chamber formed in the housing. The trailer apparatus drawbar may be formed to enable mounting of a jack means therewith to properly position an operating crank on the side of the trailer.

An object of the present invention is to provide a new and improved gooseneck trailer.

Another object of the present invention is to provide a new and improved gooseneck trailer having removable superstructure for use with specialized cargos.

A further object of the present invention is to provide a new and improved gooseneck drawbar for a trailer.

BRIEF DESCRIPTION OF THE DRAWINGS

FIG. 1 is a side view of one embodiment of the trailer apparatus of the present invention;

FIG. 2 is a perspective view illustrating the gooseneck drawbar of the trailer apparatus;

FIG. 3 is a perspective view illustrating in detail the connection of the trailer apparatus drawbar to a towing vehicle;

FIG. 4 is an expanded perspective view of a second embodiment of the trailer apparatus of the present invention;

FIG. 4A is an end view, in section, illustrating in greater detail a portion of the trailer apparatus embodiment of FIG. 4;

FIG. 5 is a top view illustrating the spacing of the superstructure and the gate pivot axis;

FIG. 6 is a side view of one embodiment of a rear gate for the trailer apparatus superstructure of the present invention;

FIG. 7 is a view illustrating in detail the locking arrangement of the gate of FIG. 6;

FIG. 8 is a side view of a divider gate of the trailer apparatus superstructure of the present invention;

FIG. 9 is a view taken along line 9—9 of FIG. 8;

FIG. 10 is a side view of a second embodiment of the rear gate of the present invention;

FIG. 11 is a view taken along line 11—11 of FIG. 10;

FIG. 12 is a side view of a portion of the trailer apparatus of the present invention illustrating another embodiment of superstructure mountable thereon; and FIG. 13 is a view taken along line 13—13 of FIG. 12.

DESCRIPTION OF THE PREFERRED EMBODIMENTS

One embodiment of the novel gooseneck-type trailer apparatus of the present invention, generally designated T, and its connecting relationship with a towing vehicle V is illustrated in FIG. 1 while a second embodiment is illustrated in FIG. 4. Movement of the towing vehicle V effects movement of the connected trailer apparatus T and a load or cargo positioned thereon to a desired location in the well known manner.

As illustrated in FIG. 4, the trailer apparatus T includes one or more axle housings H upon which a support frame F of the trailer apparatus is mounted. The axle housing H includes freely turning axle (not illustrated) suitably journaled therein for rotatably mounting a pair of parallel spaced wheels W on opposite sides of the trailer apparatus T which support the housing H and enable towing movement of the trailer apparatus T as is well known. Any number of housings H may be utilized with the trailer apparatus T and the number used is normally a matter of design based in part upon predicted loading and trailer length. The wheels W are preferably mounted on axle hubs 20 (FIG. 4) by lugs 21 to enable rapid changing of the wheels W when desired as is well known.

The support frame F is normally mounted with a spring assembly (not illustrated) on the axle housing H and includes a pair of spaced substantially horizontal side members 22 and 23 and a load or cargo carrying member 24 mounted with the side members 22 and 23 forming a substantially planar surface or deck 25 on which is positioned the load or cargo to be transported by the trailer apparatus T. In the Lowboy embodiment illustrated in FIG. 1, the deck 25 may have a tapered portion 26 adjacent the rear 27 of the trailer T to aid in loading and unloading drive-on cargo. Suitable compartments (not illustrated) may be provided below the support member 25 and between the side members 22 and 23 for storage of loading ramps (not illustrated). The support frame F normally includes suitable internal cross-bracing (not illustrated) between the members 22 and 23 for effecting structural integrity of the frame F and the trailer apparatus T as is well known.

Both embodiments of the trailer apparatus T include a drawbar assembly D connected with the support frame F adjacent a first brace or front end 28 and a hitch or connector means C mounted on the drawbar assembly D for releasably connecting the trailer apparatus T with the towing vehicle V for imparting the towing force to the trailer apparatus T to effect the desired movement thereof. As illustrated in FIGS. 1 and 2, the drawbar assembly D includes a plurality or pair of spaced substantially vertical members 30 and 31 having a first or lower end 30a and 31a secured or connected with the members 22 and 23, respectively, in a suitable manner, such as, but not limited to, welding, and a corresponding plurality or pair of gooseneck forming members 32 and 33 having a substantially horizontal first portion 32a and 33a connected with the vertical members 30 and 31, respectively, at a location spaced from the connection with the members 22 and 23 and extending forward of the vertical members 30 and 31 to a second portion 32b and 33b of the gooseneck forming members 32 and 33, respectively, which angle downwardly from the substantially horizontal first portions 32a and 33a at an angle of 30° or more to the hitch C. The connection of the vertical member 30 and the horizontal portion 32a of the drawbar member 32, is formed at substantially a right angle in which is secured a reinforcing plate member 34 which is preferably in the form of an isoceles triangle having a first edge or end 34a secured or connected to the vertical member in a suitable manner, which preferably is welding, and a second edge or end 34b connected or secured with the horizontal portion 32a of the member 32 to provide a unitary connection and thereby imparting structural integrity to the drawbar assembly D. A second reinforcing plate 35 is secured to the member 31 and the drawbar forming member 33 in a similar manner. Additional reinforcing gussets 36 and 37 may be secured to the drawbar forming member 32 to strengthen these members at the angular transition from the horizontal portion to the angled portion as illustrated in FIG. 2, and suitable diagonal bracing 38 may be employed between the substantially vertical members 30 and 31 and between the drawbar forming members 32 and 33 to form a structurally sound and rigid drawbar assembly D. Additionally, the reinforcing between the drawbar forming members 32 and 33 may be used for mounting a spare tire 39 on the drawbar assembly D as illustrated. The size of the plates 34 and 35 is limited by the need for turning clearance of the towing vehicle which need also limits the size of the plates 36 and 37.

The drawbar forming member 32 and 33 taper or angle inwardly to join adjacent the connector means C mounted thereon as illustrated in FIG. 3. Any suitable connector means C may be employed, but preferably the connector means includes a sleeve 40 which is concentrically mounted with a substantially vertical rotatable pin P mounted on the towing vehicle V. The sleeve 40 includes a pair of aligned openings or ports 41 and 42 which align with an opening or eye (not illustrated) of the pin P to enable insertion of a connector pin 43 when these openings are brought in registry with the eye for releasably connecting or hitching the trailer apparatus T with the towing vehicle V. The connector pin 43 includes an eye 43a which receives a portion of a pin 44 for maintaining the pin 43 in the connecting position. The pin 44 is vertically slidable in a sleeve 45 secured to the sleeve 40 to enable removal of the pin 43 from the openings 41 and 42 when desired. A second sleeve 46 is also secured to the sleeve 40 above the sleeve 45 for receiving and storing the connecting pin 43 therein when the trailer apparatus T and the towing vehicle V are not connected. The sleeve 46 thus serves as a retaining means to hold the pin 43 in a position preventing damage thereof when aligning and connecting the towing vehicle V with the trailer apparatus T and which is also spaced from the sleeve 45 to enable movement of the pin 44 to release the connector pin 43, but engages the pin 44 to block its movement out of the sleeve 45.

The trailer apparatus T includes an adjustable jack means J mounted with the front brace 28 for supporting the trailer apparatus T when not connected to the towing vehicle V and lowering the sleeve 40 over the pin P when effecting towing connection. Many types of trailer jacks are well known and may be employed with the present invention, but preferably for ease of operation and safety reasons, a rotary screw type is used in conjunction with the right angle gear box (not illustrated) to enable positioning or mounting of a jack operating crank 48 on the side of the drawbar assembly D is preferred. The crank 48 is preferably pivoted or hinged at 49 to enable storing of the crank when not in use. Rotation of the crank 48 thus effects movement of a support wheel 50 of the jack means J relative to the support frame 22 and moves the sleeve 40 in a substantially vertical path as desired and which is well known.

Referring now to FIG. 1, the significance of applicant's construction of the gooseneck drawbar is apparent in that the hitch C is placed over or forward of a rear axle A of the towing vehicle V for effecting proper weight distribution therebetween without having a gooseneck of excessive length. As the towing vehicle V is most frequently a pick-up type truck the drawbar D must be formed to provide necessary turning clearance when the trailer apparatus T is under tow and of sufficient rigidity and strength to carry the heavy loads transportable by the trailer apparatus T without danger of catastrophic failure of the drawbar D. Applicant's drawbar structure D enhances the driver's visibility by its reduced height and reduces overall length of the towing vehicle V and trailer apparatus T when under tow. The portions 32b and 33b of the drawbar angling sharply downward are preferably angled in the range of 30° to 40° from the horizontal portions, 32a and 33a, respectively, to shorten the overall length of the drawbar D and connect with the sleeve 40 closely adjacent the connection with the pin P to reduce the length of the sleeve 40 which is a frequent source of structural failure in the prior art.

The second embodiment of the trailer apparatus T of the present invention is partially illustrated in FIG. 4 where like reference characters are employed to refer to like parts. The horizontal side members 22 and 23 are preferably formed into one piece of complex cross-sectional shape illustrated in FIG. 4A, which supports the load carrying member or members 24 with an inwardly projecting lower flange 23a and having an upper outwardly extending flange 23b serving both as a trailer fender and a walk-around platform. A plurality of spaced gussets 122a and 123a provide suitable reinforcing for the upper flanges 22b and 23b, respectively. The members 22 and 23 are connected by a plurality of spaced cross-braces 124 forming a portion of the support member 25 for structural integrity of the frame F and which are in turn connected with the plurality of spaced longitudinally extending bracing members 125. The drawbar assembly D, which is partially illustrated in FIG. 4, is similar in construction and attachment to that of the first embodiment, illustrated in FIGS. 1 and 2.

The rear bumper and cross-brace 27 is illustrated spaced from the members 22 and 23, but when assembled, the forwardly projecting end portions 27a are secured beneath and with the rear gussets 122a and 123a as well as with the horizontal members 22 and 23 and the rear brace 124 which imparts a greater rigidity than normally provided by such trailer apparatus.

The trailer apparatus T embodiment illustrated in FIG. 4 is particularly well-suited for transportation of livestock and the like when cage superstructure means, generally designated as S, is included, but the use of this embodiment should not be considered so limited. Preferably, the cage superstructure S is formed in a self-supporting manner in order that it may be securely mounted or de-mounted from the support frame F by the use of suitable securing or fastening means such as bolting (not illustrated) extending through a plurality of openings in the members 22 and 23 and the aligned corresponding plurality of openings 61 in the superstructure S. The superstructure S includes a pair of parallel longitudinally extending lower support members 62 and 63 supporting the superstructure S on the flanges 22b and 23b, respectively, a plurality of spaced post members 64 extending vertically upward from the support members 62 and 63 and which are preferably joined at the upper portion by horizontal members 64a. Suitable bracing members 65 are connected with the upper portions 64a for effecting desired rigidity of the superstructure S but a roof panel may be used to provide the desired bracing. The superstructure S preferably includes three panels 66 and six bars 67 extending along each side of the trailer apparatus T and connected to the posts 64 to form a cage for containing the livestock located on the surface 24. The cage forming members may also extend around the front of the cage for effecting closure or a solid panel to provide shelter from the wind may be employed.

The superstructure S includes a rear gate means G pivotally mounted at the rear of the superstructure S for enabling loading and unloading of the trailer apparatus T as desired. The gate means G is pivotally mounted in the vertically aligned sleeves 68 secured at spaced locations to the rear post member 64b. As illustrated in FIG. 5, the sleeves 68 are also spaced from the member 64a with extensions 68a to enable the gate G to pivot through an arc of 180° between the closed and full open position (illustrated in phantom) which is a highly desirable feature as the trailer may be backed flush with a loading chute or the like with the gate G in the open position.

The superstructure S may also include one or more divider gates or separator means X for forming or dividing the superstructure S into a number of smaller load carrying compartments when desired. As illustrated in FIG. 8, the divider gate X includes an outer frame member 70 pivotally positioned in sleeves 71 which are secured to a suitable upright post 64 for operably mounting the gate with the superstructure S and a plurality of cage forming bars 72 for blocking passage of livestock or other cargo when the separating gate X is in the closed position. The divider gate X is held in the closed position by the latch means L (FIG. 9) which includes a resilient member 73 secured at one end with a cage forming rod 67 and a stop 74. When the frame member 70 is adjacent the stop 74, the resilient member 73 moves inwardly above and below the rod 67 to block movement of the gate X by engaging the frame member 70 with inwardly projecting lug portions 73a. When it becomes desirable to open the divider gate X, the member 73 is flexed outwardly to move the lug 73a from engagement with the member 70 and enables the gate D to swing aside.

As illustrated in the closed position in FIG. 6, a dual outside pivoted gate 80 and 81 embodiment of the rear gate means G may be employed which uses a new and improved locking system to maintain the gates 80 and 81 in the position illustrated. The gate means G includes a locking system K having a riser 82 secured to a cross-beam adjacent the rear brace 27 for receiving in opening 82a and 82b thereof, the lower end of vertically movable rods 83 and 84 slidably mounted with gates 80 and 81 in the fixed sleeves 85 and 86, respectively. The riser 82 tends to keep foreign matter from collecting in the openings 82a and 82b which otherwise would interfere with the locking of the gates 80 and 81 by the rods 83 and 84, respectively. The gates 80 and 81 are provided with a suitable arrangement of cage forming bars 87 and 88, respectively, or other suitable barrier structure to block undesired movement of the livestock or other cargo through the gates 80 and 81. The locking system K further includes a horizontally slidable pin member 89 mounted in the bore of a sleeve 90 secured to the gate 81 and which is received in aligned horizontal sleeve 91 secured to the gate 80 when the gates are in the closed position for maintaining gates 80 and 81 closed. The pin 89 is held in the lock position by a vertically movable pin 92 secured on the gate 81 which moves downwardly to block movement of the pin 89 from the sleeve 91.

The second embodiment of the rear gate means G as illustrated in FIGS. 10 and 11, is a combination swinging and sliding gate means G which is generally designated 100. The gate 100 includes an outer frame 101 which is pivotally secured to the superstructure S with the hinge sleeve 68 on one side in the manner set forth above and which extends completely across the rear of the superstructure S. A divider 102 separates the gate into a portion having suitable cage forming panels or bars 103 and an open portion or passageway through the gate 100. The gate 100 includes a cage forming slide means 104 mounted on movement guiding tracks formed by the gate means 100 for sliding movement to and from an open position enabling loading or unloading of livestock and the like through the gate 100 and a closed position (illustrated in FIG. 10) for retaining livestock and the like in the trailer T. The slide 104 is preferably formed having suitable caging panels or bars 105 secured thereto and having a pair of upwardly extending hangers 106 pivotally mounting rollers 107 riding on the movement guiding track provided by the frame 101 for enabling desired movement of the slide 104. The slide 104 is latched or secured in the closed position by a sleeve 108 receiving a movable pin 109 therethrough which is also received in the sleeve 110 and 110a secured to the frame 101. With this arrangement, the trailer apparatus T may be loaded or unloaded through the passageway without swinging the gate 100 open or the gate 100 may be pivoted open as desired.

Another embodiment of the superstructure S is illustrated in FIGS. 12 and 13, which includes a housing 130 on the load carrying surface 25 and forming a chamber therein 131 enclosing at least a portion of the load carrying surface 25. The housing 130 includes a plurality of passageways 132 formed therethrough for enabling ingress and egress to the chamber 131 from the side of the trailer T and a pair of vertical guide tracks or channels 133 on either side of each of the passages 132 and which extend upwardly adjacent the roof 134 of the housing 130 for storing a movable flexible or pivoted member door 135 when it is moved to an upper or opened position and which is slidably movable to a lower or closed position for blocking ingress and egress to the chamber 131 through the passageway 132. With this embodiment of the superstructure means S, a weather-proof housing for protecting the trailer cargo is provided as well as enabling rapid loading and unloading when a plurality of flexible member doors 135 are provided.

The foregoing disclosure and description of the invention are illustrative and explanatory thereof, and various changes in the size, shape and materials as well as in the details of the illustrated construction may be made without departing from the spirit of the invention.

What is claimed is:

1. A trailer apparatus adapted for connection with a towing vehicle to effect desired movement of a cargo or load positioned on the trailer apparatus, including:
   a. an axle housing rotatably mounting a pair of spaced wheels for supporting said axle housing;
   b. a support frame mounted with said axle housing for supporting the load on said axle housing;
   c. a drawbar assembly connected with said support frame including:
      1. a first substantially vertical member having a first lower end connected with said support frame; and
      2. a second substantially vertical member laterally spaced from said first substantially vertical member with each of said vertical members having a first lower end connected with said support frame;
      3. a first gooseneck forming member having a substantially horizontal first position connected with said substantially vertical member at a location spaced from the connection of said substantially vertical member with said frame and extending from said substantially vertical member to a second portion of said gooseneck forming member which angles downwardly from said substantially horizontal first portion at an angle greater than 30° and less than 40° to said hitch means;
      4. a second gooseneck forming member laterally spaced from said first gooseneck forming member and having a substantially horizontal first portion connected with said second substantially vertical member at a location spaced from the connection with said support frame and extending from said second substantially vertical member to a second portion of said second gooseneck forming member which angles downwardly from said substantially horizontal first portion of said second gooseneck forming member at an angle greater than 30° and less than 40° to said hitch means whereby operator visibility, usable cargo space, and overall length is enhanced; and
   d. hitch means mounted on said drawbar assembly at a location spaced from said support frame for releasably connecting said drawbar with the towing vehicle wherein towing force is imparted to said trailer apparatus for effecting movement thereof.

2. The structure as set forth in claim 1, wherein:
the connection of each of said substantially horizontal first portion of each of said gooseneck forming member with the respective substantially vertical member substantially forms a right angle.

3. The structure as set forth in claim 1, including:
a first and second reinforcing member with said first reinforcing member having a first end secured with said first substantially vertical member and a second end secured with said substantially horizontal portion of said first gooseneck member, said second reinforcing member connected to said second substantially vertical member at a first end and connected at a second end with said substantially horizontal portion of said second gooseneck member.

4. The structure as set forth in claim 3, wherein:
each of said reinforcing members is a plate for connection with said substantially vertical member along a first edge of said plate and with a second edge of said plate connecting with said substantially horizontal portion of said gooseneck forming member.

5. The structure as set forth in claim 4 wherein:
each of said reinforcing plates is in the shape of a triangle.

6. The structure as set forth in claim 5, wherein:
each of said plates is in the shape of an isosceles triangle.

7. The structure as set forth in claim 3, wherein:
said second portion of said gooseneck forming member angles downwardly from said substantially horizontal first portion to said hitch means at an angle of 33°.

8. The structure as set forth in claim 1, wherein said hitch means includes:
   a. a housing mounted on said drawbar assembly;
   b. a connector pin movable to a hitched position for releasably connecting with pin receiving hitch means on the towing vehicle; and
   c. retaining means mounted on said housing for holding said connector pin in a spaced location away from the hitched position when aligning said hitch means with the towing vehicle to effect towing connection therebetween.

* * * * *